United States Patent
Foote et al.

(10) Patent No.: US 7,411,904 B2
(45) Date of Patent: Aug. 12, 2008

(54) MULTIPROTOCOL LABEL SWITCHING (MPLS) EDGE SERVICE EXTRACTION

(75) Inventors: Richard Foote, Mississauga (CA); Usama Anqud, Sunnyvale, CA (US); Venkat Manickayasagam, Cupertino, CA (US); Kumar Mehta, Cupertino, CA (US); Rama Ramakrishnan, Santa Clara, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 922 days.

(21) Appl. No.: 10/623,784

(22) Filed: Jul. 21, 2003
(Under 37 CFR 1.47)

(65) Prior Publication Data

US 2005/0018605 A1    Jan. 27, 2005

Related U.S. Application Data

(60) Provisional application No. 60/398,001, filed on Jul. 22, 2002.

(51) Int. Cl.
  *H04L 12/26* (2006.01)
  *H04L 12/28* (2006.01)
(52) U.S. Cl. ............. 370/230; 370/395.5; 370/409
(58) Field of Classification Search ........... 370/230, 370/351–356, 396, 397, 395.5, 395.51–395.53, 370/400, 401, 409
See application file for complete search history.

(56) References Cited

U.S. PATENT DOCUMENTS

| | | | |
|---|---|---|---|
| 6,771,662 B1 * | 8/2004 | Miki et al. | 370/469 |
| 6,944,159 B1 * | 9/2005 | Fotedar et al. | 370/392 |
| 6,990,106 B2 * | 1/2006 | Bhatia | 370/395.53 |
| 7,079,544 B2 * | 7/2006 | Wakayama et al. | 370/401 |
| 7,099,912 B2 * | 8/2006 | Ishizaki et al. | 709/201 |
| 2001/0053150 A1 * | 12/2001 | Clear et al. | 370/392 |
| 2003/0110268 A1 * | 6/2003 | Kermarec et al. | 709/227 |
| 2003/0174706 A1 * | 9/2003 | Shankar et al. | 370/393 |
| 2004/0202171 A1 * | 10/2004 | Hama | 370/395.1 |

OTHER PUBLICATIONS

Lasserre, Mark, "Virtual Private LAN Services over MPLS", IETF draft-lasserre-vkompella-ppvpn-vpls-04.txt, Mar. 2003.
Kompella, K. "Virtual Private LAN Service", IETF draft-kompella-ppvpn-vpls-02.txt, May 2003.
Martini, Luca "Transport of Layer 2 Frames Over MPLS", IETF draft-martini-l2circuit-trans-mpls-09.txt, Apr. 2003.
Martini, Luca "Encapsulation Methods for Transport of Layer 2 Frames Over IP and MPLS Networks", IETF draft-martini-l2circuit-encap-mpls-04.txt, Nov. 2001.

\* cited by examiner

*Primary Examiner*—Wing F. Chan
*Assistant Examiner*—Hong Sol Cho

(57) ABSTRACT

A technique for managing network traffic is disclosed. According to the technique, a set of VLAN IDs is explicitly identified for use with a first service. The rest of the customer traffic is considered as part of a default service. Traffic that is received at a PE from a customer is examined to identify whether or not the traffic belongs to the first service. For example, the VLAN ID and incoming port of a packet is compared to the set of VLAN IDs that were allocated to the first service on the respective port. Traffic that is identified as belonging to the first service is "extracted" from the default service and forwarded on a path that is related to the first service. The remaining traffic is forwarded on a path that is related to the default service. The service extraction technique can be implemented across an MPLS domain.

32 Claims, 11 Drawing Sheets

MULTIPROTOCOL LABEL SWITCHING (MPLS) EDGE SERVICE EXTRACTION

CROSS-REFERENCE TO RELATED APPLICATION

This application is entitled to the benefit of provisional Patent Application Ser. No. 60/398,001, filed 22 Jul. 2002.

FIELD OF THE INVENTION

The invention relates generally to a technique for managing network traffic, and more particularly, to a technique for providing network services to customers through a provider network that includes, for example, a multiprotocol label switching (MPLS) domain.

BACKGROUND OF THE INVENTION

Virtual private LAN services (VPLS) over MPLS provides LAN-like connectivity between geographically diverse customer locations. Draft standards for implementing VPLS over MPLS are presented in "Virtual Private LAN Services over MPLS", IETF draft-lasserre-vkompella-ppvpn-vpls-04.txt, March 2003, and "Virtual Private LAN Service", IETF draft-kompella-ppvpn-vpls-02.txt, May 2003, "Transport of Layer 2 Frames over MPLS", IETF draft-martini-12circuit-trans-mpls-09.txt, April 2002, and "Encapsulation Methods for Transport of Layer 2 Frames Over IP and MPLS networks", IETF draft-martini-12circuit-encap-mpls-04.txt, November 2001, all of which are incorporated by reference herein.

The basic operation of VPLS is described with reference to FIG. 1 and involves establishing virtual circuit (VC) label switching paths (LSPs) and tunnel LSPs. FIG. 1 depicts an MPLS domain 102, two service provider edge devices (PEs) 104, geographically diverse customer locations 106 for two different customers, customer A and customer B, and the corresponding tunnel LSP and VC LSPs (e.g., $VC_A$ LSP and $VC_B$ LSP). In operation, a customer's Ethernet packet is either switched or routed by a customer device to one of the PEs (also known as MPLS label edge router (LERs)). The respective PE classifies the packet based on either the incoming port or the virtual local area network (VLAN) identified (ID) of an IEEE 802.1q tagged packet. The packet is then mapped to a user-defined Forwarding Equivalence Class (FEC), which specifies how the packet gets forwarded. The FEC lookup yields the outgoing port of the packet and labels that are used to encapsulate the packet. FIG. 2 depicts an example of a frame encapsulation format for implementing VPLS. A complete description of the frame format is described in the above referenced IETF document entitled "Encapsulation Methods for Transport of Layer 2 Frames Over IP and MPLS networks". The frame format includes the original Ethernet packet 208, an MPLS label stack 209, and an outer Ethernet header 212. The label at the top of the MPLS label stack is the tunnel label, which is used to transport the packet across the provider's MPLS domain. The label at the bottom of the MPLS label stack is the VC label, which is used by the egress PE to determine how to process the packet.

Upon transport through the MPLS domain, backbone label switch routers (LSRs) (not shown) in the MPLS domain only look at the tunnel label to switch the labeled packet through the MPLS domain. It is possible that additional labels get pushed along the way. The tunnel label at the top of the MPLS label stack is removed at the penultimate hop (i.e., the hop prior to the egress PE) and the packet is passed to the egress PE with only the VC label. The egress PE uses the VC label to determine how to process the packet. The packet is then forwarded to the outgoing port that is identified via the VC label.

FIG. 3 is an expanded view of a PE 204 that logically depicts an example of how customer-specific VPLS traffic is passed through the PE into an MPLS domain. In the example, customers A and B are connected to the PE via customer-specific ports (e.g., ports 1, 2, and 3). VLAN traffic received on the customer-specific ports is associated with a customer-specific VC LSP and a tunnel LSP. In the example, each customer has a unique VC LSP (e.g., $VC_A$ LSP and $VC_B$ LSP) and traffic that is destined for the same PE (e.g., $PE_2$) uses the same tunnel LSP.

In many applications, VPLS involves more than a point-to-point connection between two PEs. As depicted in FIG. 4, VPLS often involves connections between multiple distinct customer locations 406. For example, customers A and B may each have three distinct locations that are connected via the MPLS domain at PEs 1, 2, and 3. The three PEs are connected by three bidirectional tunnel LSPs (where each bidirectional tunnel is formed by two unidirectional LSPs). Customer-specific VC LSPs, which connect each PE, are also established for each customer between the connected PEs. For example, at $PE_1$, for customer A, there is a VC LSP that connects $PE_1$ to $PE_2$ and a different VC LSP that connects $PE_1$ to $PE_3$. For customer A, one VC LSP is used to carry traffic from $PE_1$ to $PE_2$ and the other VC LSP is used to carry traffic from $PE_2$ to $PE_3$. The full mesh of customer-specific VC LSPs enables unique broadcast domains for customers A and B. Although the customers use customer-specific VC LSPs, the customers share the same tunnel LSPs for transport between the same PEs.

While the above-described VPLS scheme works well to provide "virtual private" or "transparent" LAN services, customers often demand more than LAN services from their service provider. For example, customers often need access to other network services such as Internet, video on demand (VoD), and PSTN services. Current VPLS technologies do not adequately address the delivery of other network services. Therefore, what is needed is a technique for providing customers with services, such as Internet, VoD, and PSTN services, in addition to "virtual private" or "transparent" LAN services that is flexible and efficient to implement and that is complementary with the emerging VPLS standards.

SUMMARY OF THE INVENTION

In accordance with the invention, a set of VLAN IDs is explicitly identified for use with a first service. The rest of the customer traffic is considered as part of a default service. Traffic that is received at a PE from a customer is examined to identify whether or not the traffic belongs to the first service. For example, the VLAN ID and incoming port of a packet is compared to the set of VLAN IDs that were allocated to the first service on the respective port. Traffic that is identified as belonging to the first service is "extracted" from the default service and forwarded on a path that is related to the first service. The remaining traffic is forwarded on a path that is related to the default service. In an embodiment, the service extraction technique is implemented across an MPLS domain that utilizes the VPLS over MPLS techniques that are described in the above-identified IETF draft standards. An advantage of the service extraction technique is that specific services can be separated from a default service by explicitly defining the VLAN IDs that are included in the service without having to redefine the default traffic class. Extracting desired services without having to redefine the default traffic class enables flexible and efficient network management.

In an embodiment, the default service is a virtual private LAN (VPL) service and the first service is a non-VPL service such as Internet, VoD, or PSTN. In this embodiment, the set of VLAN IDs is explicitly allocated for use with the non-VPL traffic. The rest of the customer traffic is considered VPL traffic. Traffic that is received at a PE from a customer is examined to identify the non-VPL traffic. For example, the VLAN ID of a packet is compared to the set of VLAN IDs that were allocated to non-VPL traffic. Traffic that is identified as non-VPL traffic is extracted from the VPL traffic and sent to a service gateway. The remaining traffic is forwarded within the customer's VPL.

Other aspects and advantages of the present invention will become apparent from the following detailed description, taken in conjunction with the accompanying drawings, illustrating by way of example the principles of the invention.

BRIEF DESCRIPTION OF THE DRAWINGS

Throughout the description, similar reference numbers may be used to identify similar elements.

DETAILED DESCRIPTION OF THE INVENTION

Figure 5:
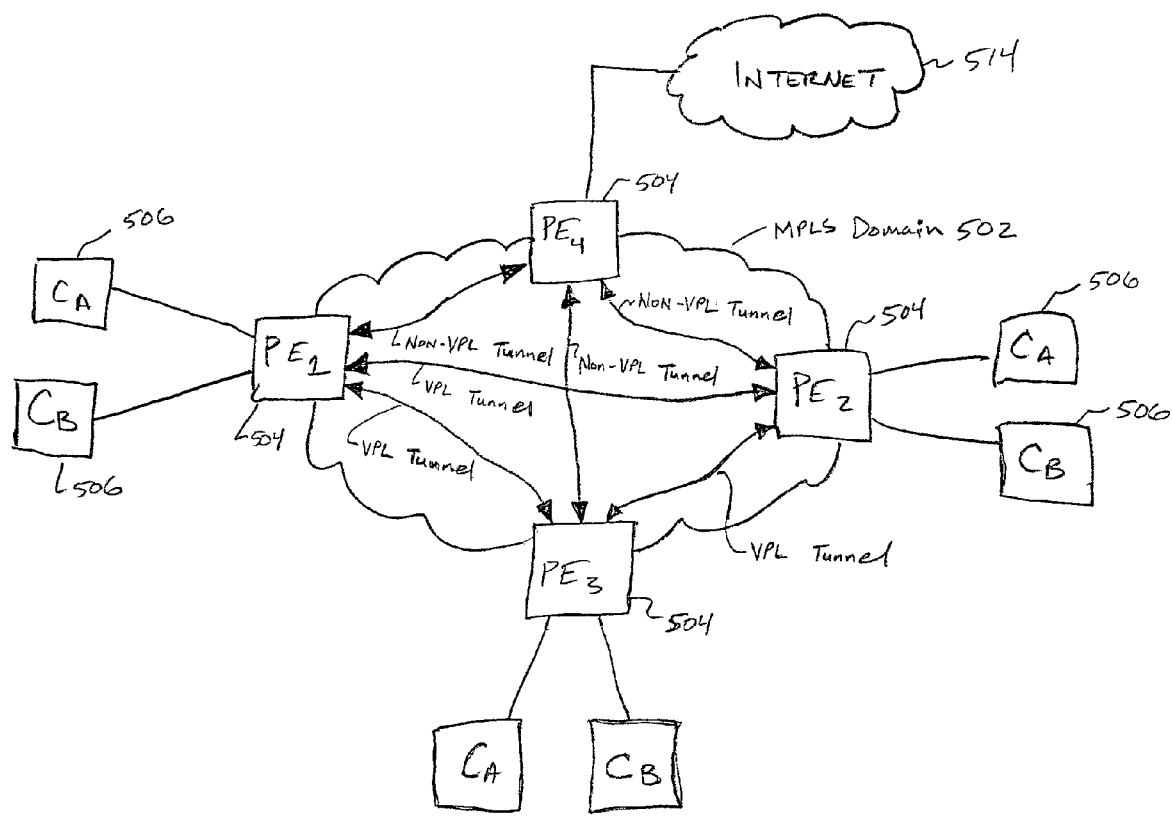
FIG. 5 depicts a service provider MPLS domain that connects multiple geographically diverse customer locations to each other and to an additional network, such as the Internet.

FIG. 5 depicts a service provider MPLS domain 502 that connects multiple geographically diverse customer locations 506 to each other and to an additional network 514, such as the Internet via PEs 504. In accordance with the invention, the customers (e.g., customers A and B) have access to virtual private LAN (VPL) and Internet services through the PEs and the MPLS domain. Providing VPL services and additional network services involves establishing different tunnel LSPs between the PEs for the VPL services and the additional services as is described in the above-identified IETF draft standards. Throughout the description, network services and traffic that are not part of the VPL services are referred to as "non-VPL" services or "non-VPL" traffic. Non-VPL services may include, for example, access to the Internet, a video on demand (VoD) network, a publicly switched telephone network (PSTN), or some other specialty network. Referring to the example of FIG. 5, the non-VPL services are accessed through $PE_4$ (also referred to herein as a "service gateway"). Non-VPL tunnels are established between $PE_4$ and the customer-connected PEs ($PE_1$, $PE_2$, and $PE_3$) to provide access to the Internet. VPL services are provided via VPL tunnels that are established between the customer-connected PEs ($PE_1$, $PE_2$, and $PE_3$). For description purposes, non-VPL and VPL tunnels are bidirectional tunnels that are actually formed by two unidirectional MPLS LSPs as is described in the above-referenced IETF draft standards.

In accordance with an embodiment of the invention, a set of VLAN IDs is explicitly identified for use with non-VPL traffic. The rest of the customer traffic falls into a default category and is treated as VPL traffic. Traffic that is received at a PE from a customer is classified to determine if the traffic is non-VPL traffic. For example, the VLAN ID of a packet is compared to the set of VLAN IDs that were explicitly allocated to non-VPL traffic. In an embodiment, the VLAN ID comparison is made on a per-port or per-customer basis such that all of the VLAN IDs have per-port or per-customer significance. Traffic that is identified as non-VPL traffic is "extracted" from the default service (e.g., the VPL service) and sent to a service gateway. The process of extracting traffic is described in more detail below. The remaining traffic is forwarded within the customer's VPL. In an embodiment, the incoming traffic goes through a traffic classification process, which identifies the traffic as belonging to a non-VPL or a VPL traffic class. The traffic classification process may be VLAN based or VLAN and port (or customer) based. Additionally, the classification could be based on a VLAN range, or ranges, or a port/VLAN range combination. Classifying the incoming traffic based on port and VLAN gives VLAN IDs per-port significance and enables the full range of VLANs to be available on each port (or to each customer).

Figure 1:
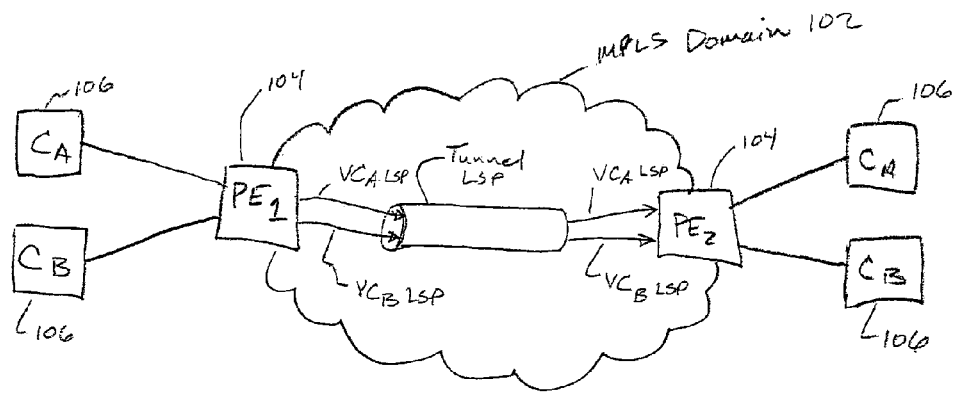
FIG. 1 depicts an MPLS domain, two service provider edge devices (PEs), and geographically diverse customer locations for two different customers, customer A and customer B.
Figure 2:
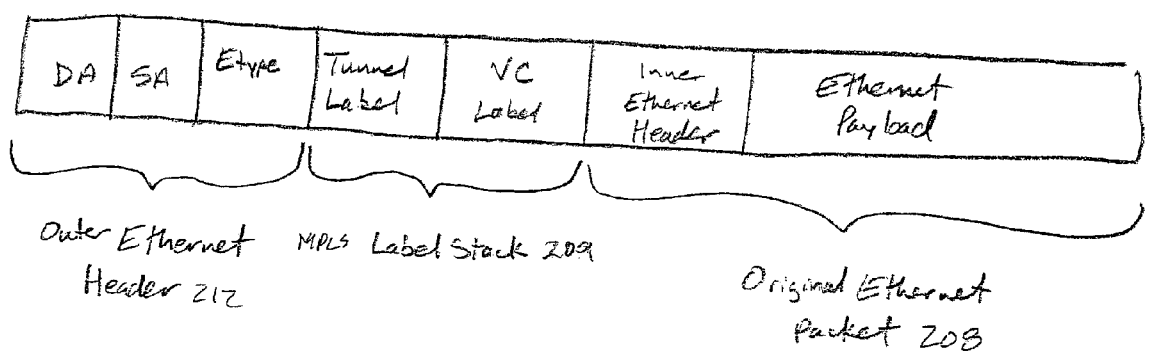
FIG. 2 depicts an example of a frame encapsulation format for implementing VPLS.
Figure 3:
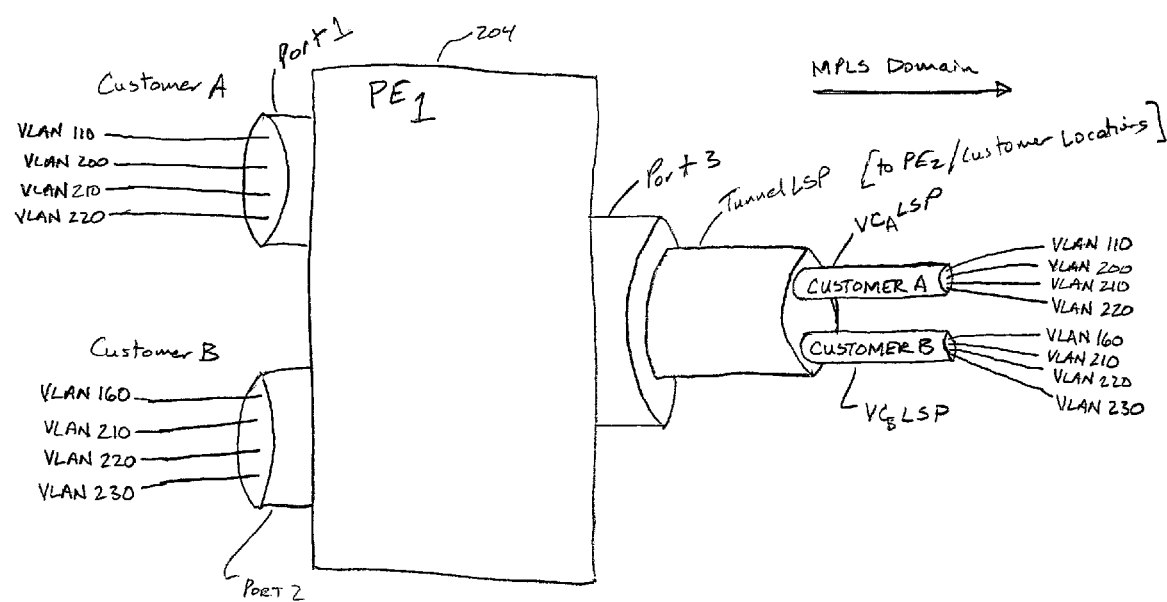
FIG. 3 is an expanded view of a PE that logically depicts how customer-specific VPLS traffic is passed through the PE into an MPLS domain.
Figure 4:
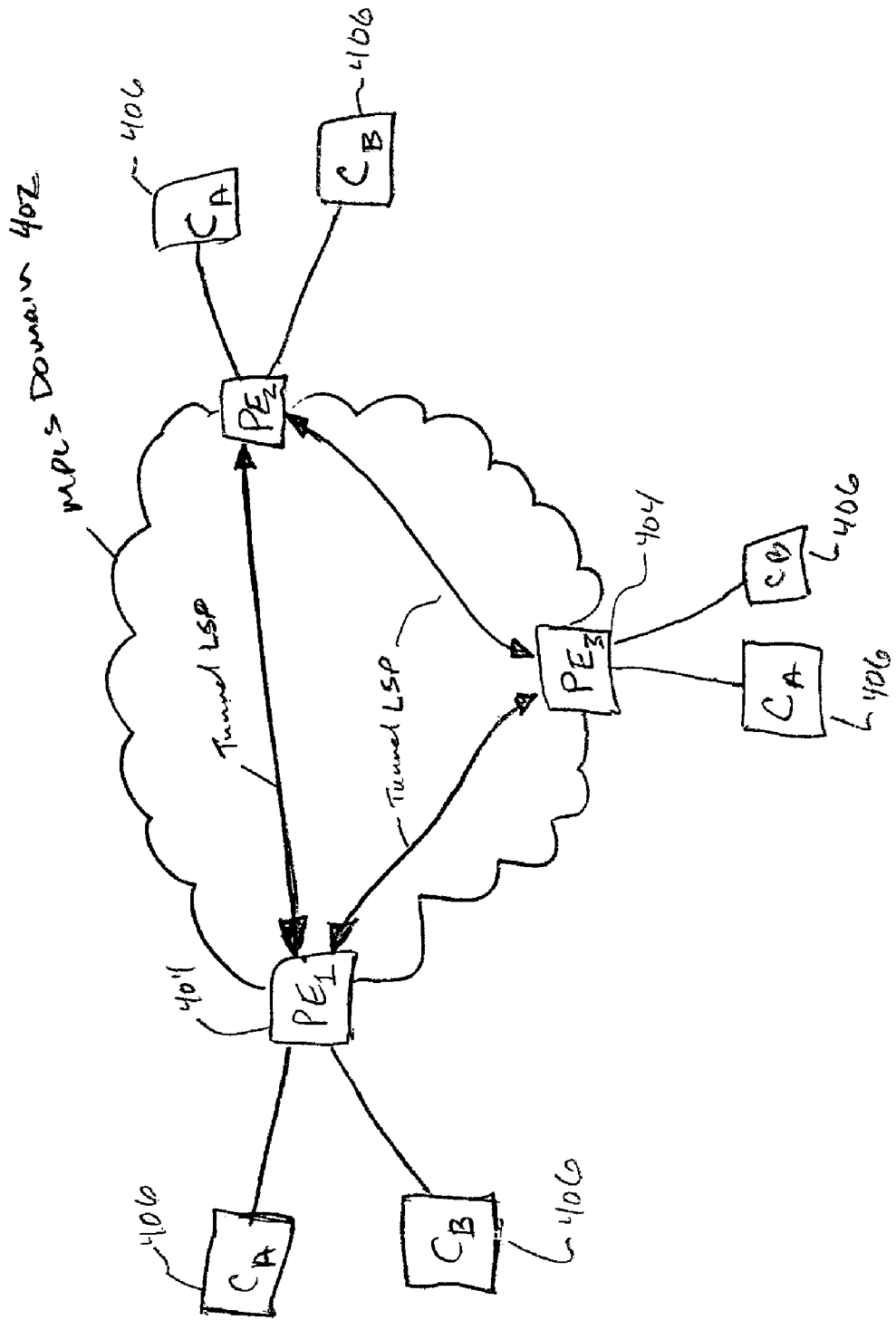
FIG. 4 depicts an MPLS domain and three PEs that are used to provide VPLS to two different customers.
Figure 6:
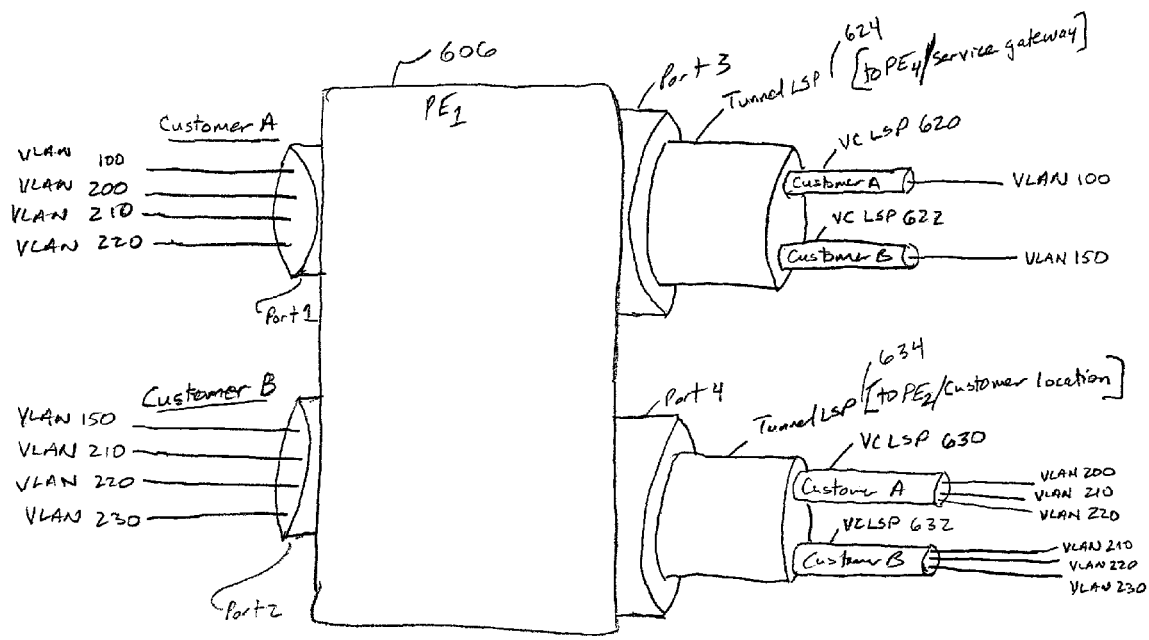
FIG. 6 is an expanded view of a PE that logically depicts non-VPL traffic that is extracted from VPL traffic at a PE upon insertion into the MPLS domain in accordance with an embodiment of the invention.

FIG. 6 is an expanded view of a PE 606 that logically depicts an example of non-VPL traffic that is extracted from VPL traffic at the point where the traffic is inserted into the MPLS domain. In the example, customers A and B are connected to the PE via customer-specific ports (ports 1 and 2). With regard to customer A, traffic is sent to the PE using VLANs 100, 200, 210, and 220. For example purposes, it is assumed that VLAN 100 is explicitly designated for non-VPL traffic. In operation, the VLAN ID of each packet that is received at the PE from the customer-facing port (e.g., a port that is directly connected to a customer device such as a switch or router) is examined. Packets with the non-VPL VLAN ID (e.g., VLAN 100) are extracted from the VPL traffic. The extracted non-VPL traffic is associated with a virtual channel (VC) LSP that is different from the VC LSPs that are associated with the VPL traffic. The extracted non-VPL traffic is also associated with a tunnel LSP that connects the PE with the desired service gateway. For example, the non-VPL traffic for customer A that is depicted in FIG. 6 is associated with a customer-specific VC LSP 620 and a tunnel LSP 624 that connects the traffic to the service gateway. Specifically, customer A's VLAN 100 traffic is associated with a customer-specific VC LSP and a tunnel LSP that connects the traffic to the service gateway (e.g., $PE_4$ as depicted in FIG. 5). Within each packet that is encapsulated as described with reference to FIG. 2, the customer-specific VC LSP and tunnel LSP are identified by corresponding VC and tunnel labels that are included in the MPLS label stack of the packet.

The traffic that is not explicitly extracted from the VPL is implicitly associated with a customer-specific VC LSP and a tunnel LSP that connect the traffic to the default service (e.g., the VPL service). In the example of FIG. 6, the default traffic is associated with a customer-specific VC LSP and a tunnel LSP that connects the traffic to one of the PEs in the VPL (e.g., $PE_2$ or $PE_3$ from FIG. 5). Specifically, customer A's VLAN 200, 210, and 220 traffic is associated with a customer-specific VC LSP 630 and a tunnel LSP 634 that connects the traffic to, for example, $PE_2$ (as depicted in FIG. 5). The customer-specific VC LSP and tunnel LSP are identified by corresponding VC and tunnel labels that are included in the MPLS label stack. It should be noted that the entire default service can be identified and tunneled using a single VC ID to VC label mapping. Managing all of the default traffic using a single VC ID greatly reduces the amount of VC ID signaling that is required between PE devices. Additionally, it conserves the consumption of available VC IDs.

With regard to customer B, traffic is sent to the PE using VLANs 150, 210, 220, and 230. For example, it is assumed that VLAN 150 is explicitly designated for non-VPL traffic. At the PE, customer B's VLAN 150 traffic is explicitly associated with a customer-specific VC LSP 622 and a tunnel LSP 624 that connects the traffic to the service gateway (e.g., $PE_4$ as depicted in FIG. 5). Customer B's VLAN 210, 220, and 230 traffic is implicitly associated with a customer-specific VC LSP 632 and a tunnel LSP 634 that connects the traffic to the default service, for example, $PE_2$ (as depicted in FIG. 5).

Note that different VC LSPs are used for a customer's VPL and non-VPL traffic (e.g., VC LSP 620 and VC LSP 630 for customer A). However, the same tunnel LSP (e.g., tunnel LSP 624) is used to transport the non-VPL traffic for customers A and B to $PE_4$. Likewise, the same tunnel LSP is used to transport the VPL traffic for customers A and B to $PE_2$. The use of common tunnel LSPs enables efficient signaling and scaling of the system. Also note that the combination of classifying traffic on an incoming port/VLAN ID basis and the VPLS tunneling scheme enables each customer to utilize the total available VLAN ID space (e.g., 4,096 unique 802.1q VLAN IDs). For example, customers A and B are allowed to use the same VLAN IDs (e.g., VLANs 210 and 220) without having their traffic mixed up.

In accordance with an embodiment of the invention, non-VPL traffic is extracted from VPL traffic using a default technique. According to an embodiment of the default technique, the entire range of VLAN IDs is made available to a customer for use at a customer-specific port. A set of the available VLAN IDs is then explicitly identified for use with non-VPL traffic. The set of VLAN IDs could include only one VLAN ID or multiple contiguous (e.g., VLANs 1-7) or non-contiguous (e.g., VLANs 1, 3, and 7) VLAN IDs. Preferably, the set of VLAN IDs is explicitly allocated on a per-port or per-customer basis. In an embodiment, the VLAN IDs are the VLAN IDs that are defined in the IEEE 802.1q specification. Traffic that is identified by the explicitly identified VLAN IDs is considered to be non-VPL traffic. In an embodiment, explicitly identifying VLAN IDs involves coding the identified VLAN IDs into the classification process on a per-port basis as VLAN IDs that are to be handled according to a set of rules that is different from the default traffic. In an embodiment, explicitly identifying VLAN IDs triggers the establishment of corresponding VC IDs, layer 2 (L2) FECs, tunnel labels, and VC labels, where layers are defined by the International Standardization Organization (ISO) in the Open System Interconnection (OSI) model. The explicit allocation of VLAN IDs also triggers a signaling process to other PEs in the MPLS domain.

Any other traffic (either 802.1q tagged or untagged traffic) received at the port is implicitly considered to be VPL traffic. That is, traffic that is not explicitly identified as traffic that is to be extracted from the VPL traffic falls into the default category and is forwarded within the default service.

Figure 7:
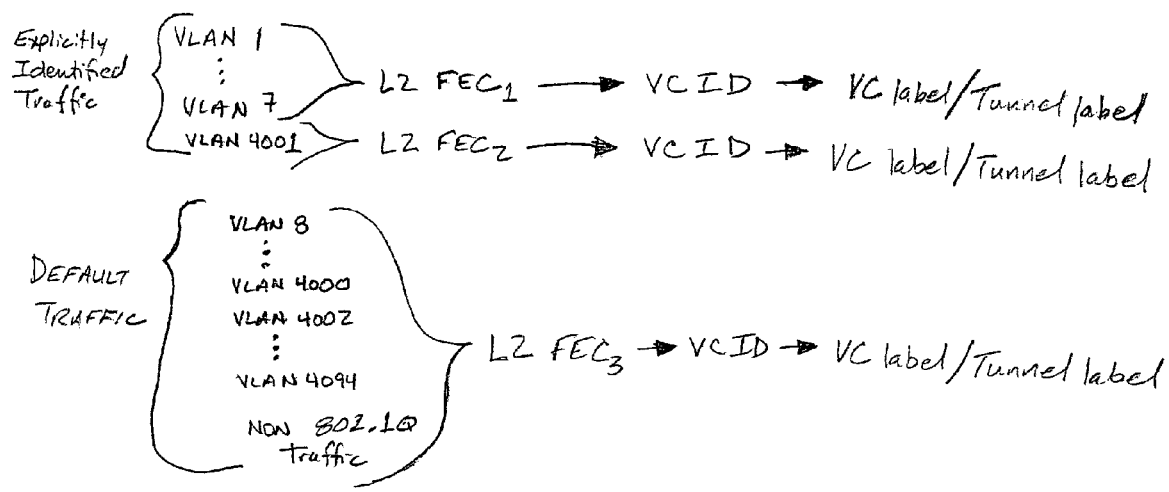
FIG. 7 graphically depicts an example of the service extraction process in accordance with an embodiment of the invention.

According to the default technique, incoming traffic is first checked on a per-port basis to see if it corresponds to a non-VPL VLAN ID. Traffic having a non-VPL VLAN ID is associated with a corresponding L2 FEC. All of the traffic that is not explicitly identified is implicitly associated with a different corresponding L2 FEC. FIG. 7 graphically depicts an example of the extraction process. In the example of FIG. 7, it is assumed that the entire range of 802.1q VLAN IDs is available to a customer at a customer-specific port of the PE. The set of VLAN IDs, including 802.1q VLANs 1-7 and 4001, is explicitly allocated to non-VPL traffic. Note that the number of unique VLAN IDs available according to the 802.1q standard is actually limited to 4,094 because the value of all ones (0xFFF or 4,095) is reserved and the value of all zeros (0x000 or 0) indicates a priority tag. All other traffic received at the port, either 802.1q tagged or untagged traffic, falls into the default category and is implicitly considered VPL traffic. In the example of FIG. 7, VPL traffic includes 802.1q VLANs 8-4000 and 4002-4094 and all untagged (or non-802.1q) traffic that is received at a respective port.

In operation, traffic is associated with a particular L2 FEC in response to a traffic classification process that first checks incoming traffic for non-VPL VLAN IDs. If incoming traffic has one of the explicitly identified VLAN IDs, then the traffic is associated with a corresponding L2 FEC. The corresponding L2 FEC is then used to identify a VC ID, which is in turn used to identify the corresponding VC label and tunnel label pair. As depicted in FIG. 7, the explicitly identified VLAN IDs can correspond to different L2 FECs. Traffic that is not explicitly identified by VLAN ID falls into the default category. The default traffic is associated with a corresponding L2 FEC and the L2 FEC is used to identify a VC ID, which is in turn used to identify the corresponding VC label and tunnel label pair. In accordance with the invention, all of the default traffic can be represented by a single VC ID.

Although in FIGS. 5-7 the explicitly defined traffic is described as non-VPL traffic and the default traffic is described as VPL traffic, the VPL/non-VPL distinction is not critical to the invention. That is, the explicitly defined traffic could be related to a first service, which could include any type of service, while the default traffic is related to a second service, which also could include any type of service.

Figure 8:
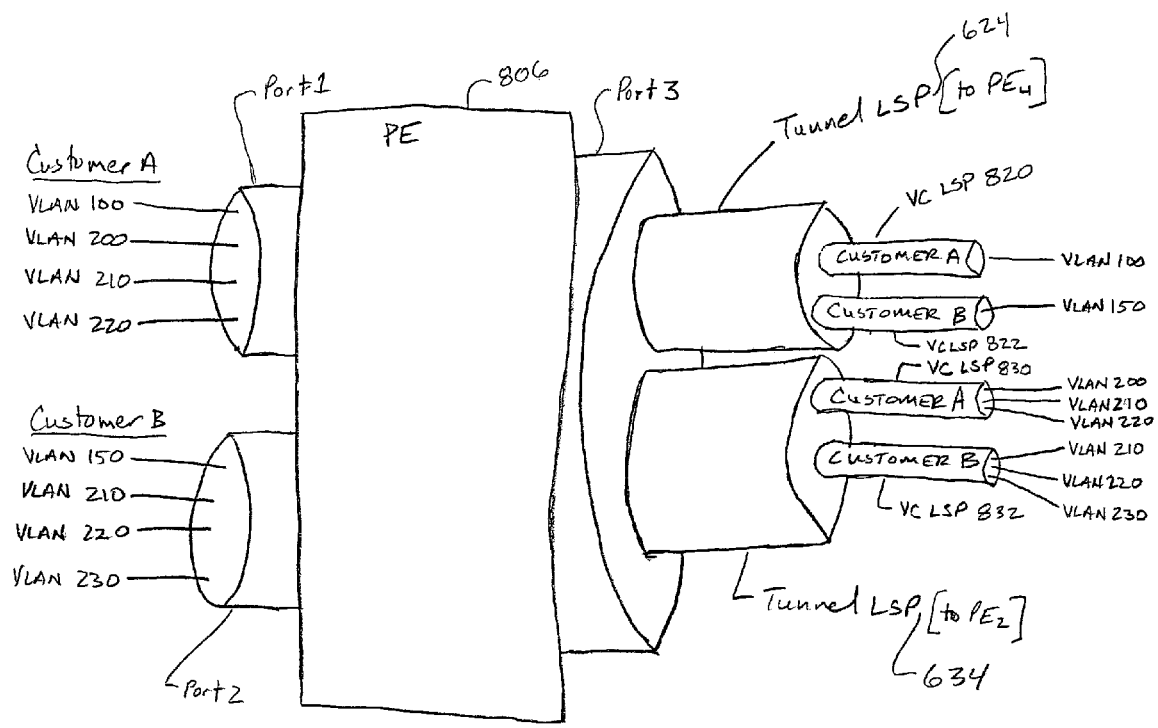
FIG. 8 is an expanded view of a PE that logically depicts VPL and extracted non-VPL traffic that is sent out of the same physical port but different tunnel LSPs in accordance with an embodiment of the invention.

In the example of FIG. 6, the VPL and non-VPL traffic is sent out of the PE on different physical ports. In some network configurations, the service gateway may be reachable through the same physical port from which other PEs within the VPL are reachable. Non-VPL traffic can be extracted from VPL traffic even though the extracted traffic is sent out of the same physical port of the respective PE. For example, VPL and non-VPL traffic can be sent out of the same physical port using different tunnel LSPs that connect the different traffic to the different PEs. FIG. 8 is an expanded view of a PE 806 that logically depicts VPL and extracted non-VPL traffic that is sent out of the same physical port (e.g., port 3) using different tunnel LSPs. As depicted in FIG. 8, non-VPL traffic from customers A and B that is destined to $PE_4$ is sent from port 3 of $PE_1$ using one tunnel LSP (tunnel LSP 624) while VPL traffic from customers A and B that is destined to $PE_2$ is sent from the same physical port using a different tunnel LSP (tunnel LSP 634).

Figure 9:
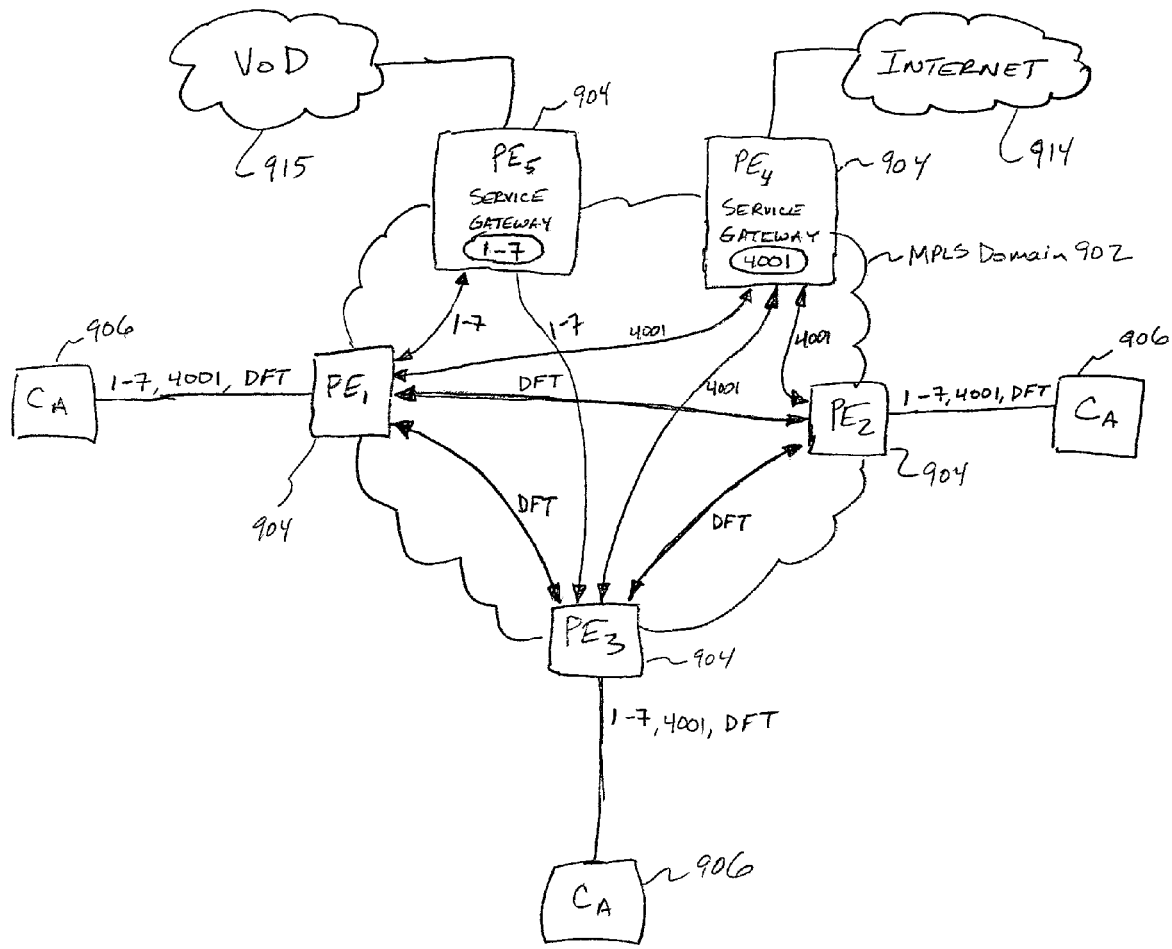
FIG. 9 depicts a network architecture in which a customer is provided access to distinct VoD and Internet networks in addition to the VPL services in accordance with an embodiment of the invention.

In accordance with an embodiment of the invention, more than one type of service can be provided using the above described technique. For example, a customer may desire access to two different networks in addition to the VPL services. FIG. 9 depicts a network architecture in which a customer is provided access to distinct VoD and Internet networks in addition to the VPL services. In the example of FIG. 9, non-VPL traffic for the VoD network 915 is explicitly allocated VLANs 0-7 and traffic for the Internet 914 is explicitly allocated VLAN 4001. The remaining traffic falls into the default (DFT) category and is implicitly treated as VPL traffic. In the example of FIG. 9, non-VPL tunnels (which correspond to VLANs 1-7 and 4001) are established between each PE and each of the service gateways for non-VPL traffic and VPL tunnels (which correspond to the default traffic) are established between the PEs ($PE_1$, $PE_2$, and $PE_3$) for the VPL traffic.

Figure 10:
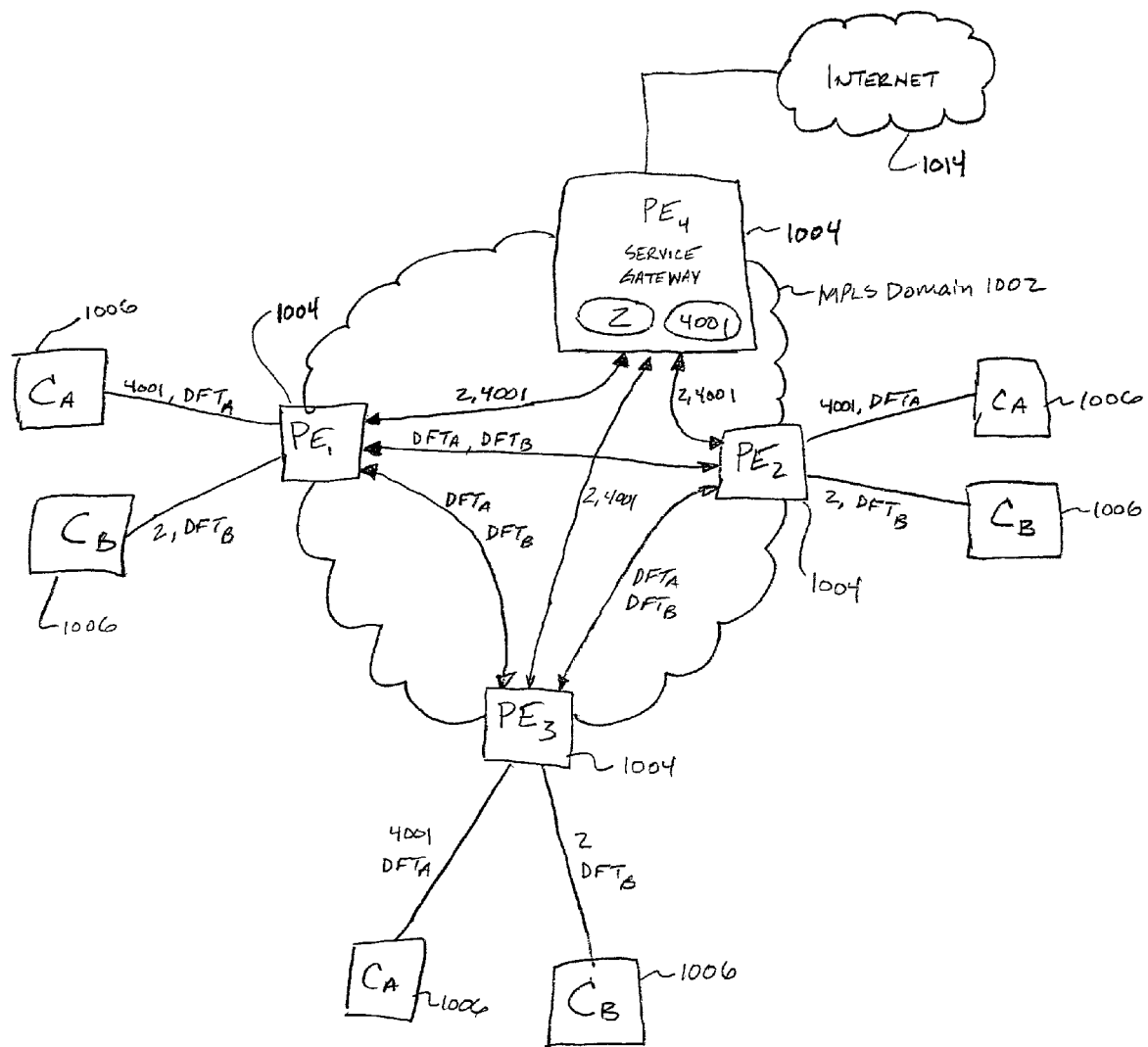
FIG. 10 depicts an example of two different customers that access the same non-VPL service in accordance with an embodiment of the invention.

It is also likely that more than one customer will desire access to the same non-VPL network (e.g., the Internet). FIG. 10 depicts an example of two different customers that access the same non-VPL service. In the example, customer A has allocated VLAN 4001 to non-VPL traffic while customer B has allocated VLAN 2 to non-VPL traffic. Non-VPL traffic that is received at a PE from a customer-facing port is transported to the service gateway (i.e., $PE_4$) using a non-VPL tunnel that connects the respective PE to the service gateway. VPL traffic is sent to the appropriate PE(s) using a VPL tunnel that connects the respective PEs in the VPL. Because incoming traffic can be classified on a port/VLAN ID basis and because traffic is tunneled in customer-specific VC LSPs as described above, each customer-specific port can utilize the entire available set of VLAN IDs without causing traffic to be mixed. Therefore, customers can use the same VLANs to identify the same services without causing different customers' traffic to be mixed. For example, customers A and B can both use the same VLAN to identify non-VPL traffic that is to be delivered to the same service gateway with the service gateway translating the common VLAN ID to two unique VLAN IDs.

Figure 11:
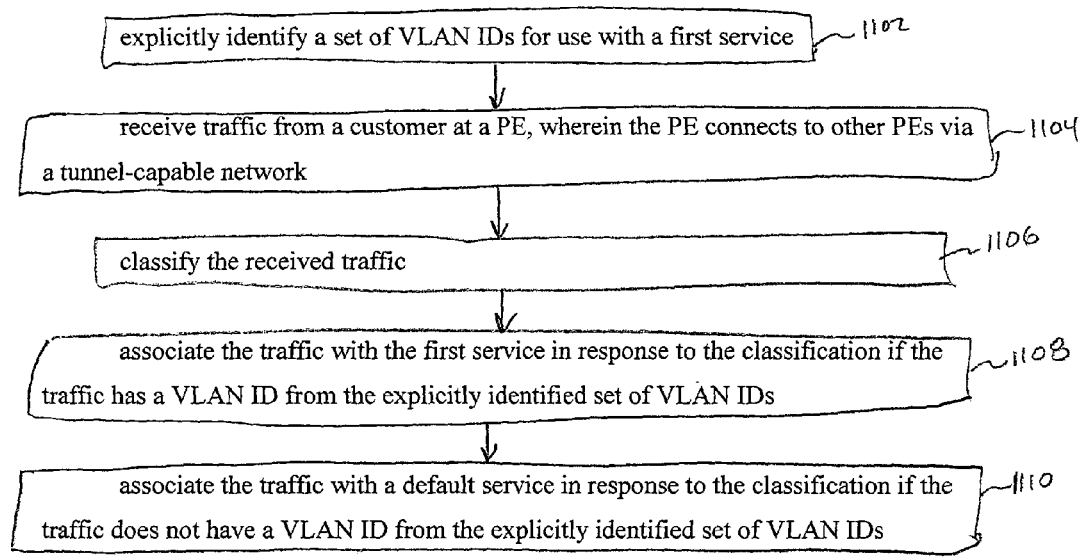
FIG. 11 depicts an embodiment of a method for managing network traffic in accordance with an embodiment of the invention.

FIG. 11 depicts an embodiment of a method for managing network traffic in accordance with an embodiment of the invention. At step 1102, a set of VLAN IDs is explicitly identified for use with a first service. At step 1104, traffic from a customer at a PE is received, wherein the PE connects to other PEs via a tunnel-capable network. At step 1106, the received traffic is classified. At step 1108, the traffic is associated with the first service in response to the classification if the traffic has a VLAN ID from the explicitly identified set of VLAN IDs. At step 1110, the traffic is associated with a default service in response to the classification if the traffic does not have a VLAN ID from the explicitly identified set of VLAN IDs.

Figure 12:
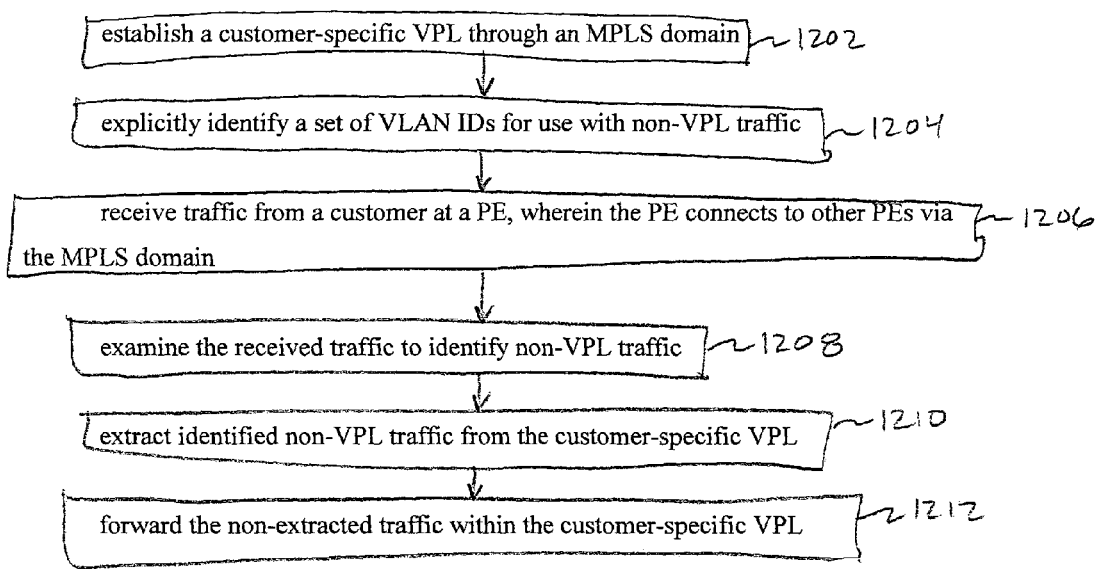
FIG. 12 depicts another embodiment of a method for managing network traffic in accordance with an embodiment of the invention.

FIG. 12 depicts another embodiment of a method for managing network traffic in accordance with an embodiment of the invention. At step 1202, a customer-specific VPL is established through an MPLS domain. At step 1204, a set of VLAN IDs is explicitly identified for use with non-VPL traffic. At step 1206, traffic is received from a customer at a PE, wherein the PE connects to other PEs via the MPLS domain. At step 1208, the received traffic is examined to identify non-VPL traffic. At step 1210, non-VPL traffic is forwarded outside of the customer-specific VPL. At step 1212, the remaining traffic is forwarded within the customer-specific VPL.

Figure 13:
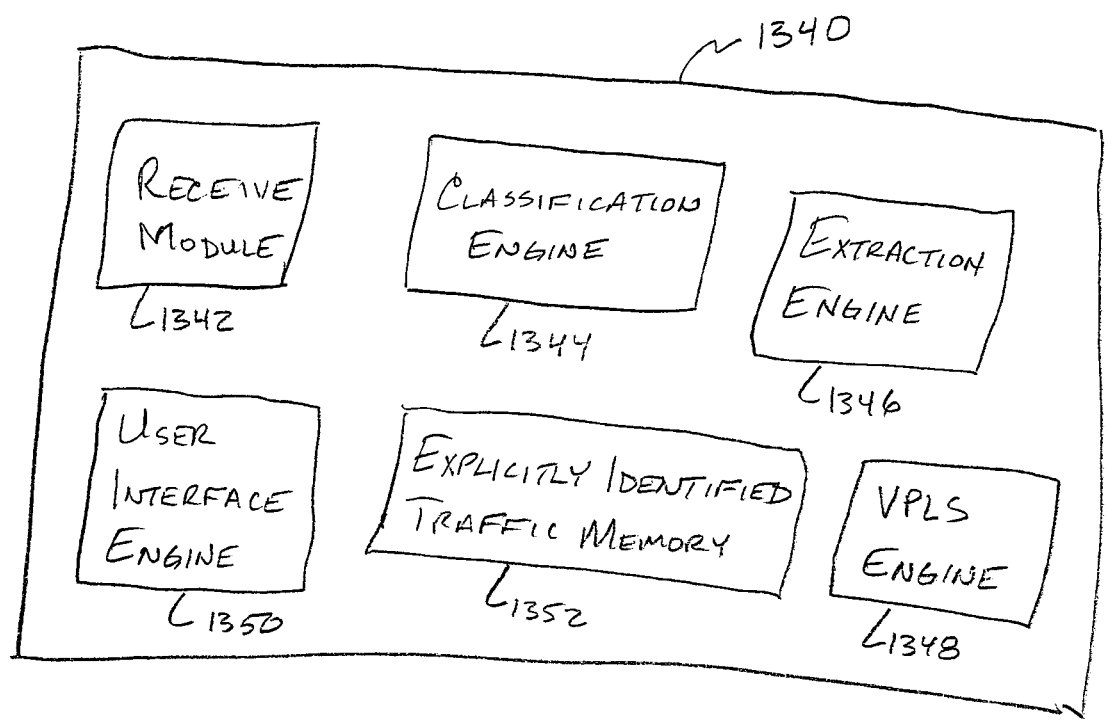
FIG. 13 depicts a system for implementing service extraction within a PE in accordance with an embodiment of the invention.

FIG. 13 depicts a system for implementing service extraction within a PE as described above with regard to FIGS. 5-12. The system includes a receive module 1342, a classification engine 1344, an extraction engine 1346, a VPLS engine 1348, a user interface engine 1350, and a memory 1352 for storing explicitly identified traffic. The receive module performs standard functions for receiving network traffic into the PE, either from customer-facing ports or MPLS ports. The classification engine performs classification functions on incoming traffic. As described above, the classification engine can classify traffic at least in part based on VLAN ID, incoming port, or the combination of VLAN ID and incoming port. The user interface engine provides the user interface that enables VLAN IDs to be explicitly provisioned for extraction. Explicitly identified VLAN IDs can be stored in the explicitly identified traffic memory. The VPLS engine performs VPLS functions as described in the above-identified IETF draft standards. The extraction engine performs the service extraction functions described above with regard to FIGS. 5-12. In an embodiment, the system elements are embodied in an application specific integrated circuit (ASIC), multiple ASICs, a field programmable gate array (FPGA), or multiple FPGAs. Alternatively, the system elements could be embodied in a multifunction processor and external memory, or any combination of ASICs, multifunction processors, and memory.

In an embodiment, service extraction can be implemented in a network environment other than MPLS. For example, other transport tunnels that can be used by pseudo-wires (e.g., GRE, L2TP, IPSEC, etc.) can also be used, as long as the originating PE can be identified. That is, service extraction can be implemented in other tunnel-capable networks that utilize, for example, GRE, L2TP, or IPSEC.

Although the traffic is described herein as either VPL or non-VPL traffic, it should be noted that, in an embodiment, the traffic is distinguished in that it is related to different services. For example, the service extraction technique can be utilized to deliver the explicitly identified traffic to a first service (e.g., VoD) and the implicitly identified traffic to a second service (e.g., Internet).

Although specific embodiments of the invention have been described and illustrated, the invention is not to be limited to the specific forms or arrangements of parts as described and illustrated herein. The invention is limited only by the claims.

What is claimed is:

1. A method for managing network traffic comprising:

explicitly identifying a set of virtual local area network (VLAN) identifiers (IDs) for use with a first service;

receiving traffic from a customer at a provider edge device (PE), wherein said PE connects to other PEs via a tunnel-capable network;

classifying said traffic;

associating said traffic with said first service in response to said classification if said traffic has a VLAN ID from the explicitly identified set of VLAN IDs;

associating said traffic with a default service in response to said classification if said traffic does not have a VLAN ID from the explicitly identified set of VLAN IDs; and redefining the explicitly identified set of VLAN IDs without having to redefine VLAN IDs that result in traffic being associated with the default service.

2. The method of claim 1 wherein said traffic is classified at least in part based on a VLAN ID that is associated with said traffic.

3. The method of claim 1 wherein said traffic is classified at least in part based on an incoming port of said traffic.

4. The method of claim 1 wherein said traffic is classified at least in part based on an incoming port of said traffic and the VLAN ID of said traffic.

5. The method of claim 1 wherein said tunnel-capable network is a multiprotocol label switching (MPLS) network.

6. The method of claim 5 further including encapsulating packets of said traffic with a tunnel label and a virtual circuit (VC) label for transport across said MPLS network.

7. The method of claim 1 wherein said traffic is forwarded from said PE utilizing a virtual private LAN service (VPLS) over multiprotocol label switching (MPLS) technique that involves encapsulating packets of said traffic with a tunnel label and a VC label.

8. The method of claim 1 wherein said default service is a virtual private LAN (VPL) service.

9. The method of claim 8 wherein said first service and said VPL service include encapsulating Ethernet packets with a tunnel label and a VC label.

10. The method of claim 1 further including an initial step of assigning a range of VLAN IDs to said customer and wherein said set of VLAN IDs is explicitly identified from said assigned range of VLAN IDs.

11. The method of claim 1 wherein associating said traffic with said first service includes identifying a layer 2 (L2) forwarding equivalency class (FEC) that is related to said first service and wherein associating said traffic with said default service includes identifying an L2 FEC class that is related to said default service.

12. The method of claim 1 wherein explicitly identifying a set of VLAN IDs includes identifying a set of IEEE 802.1q VLAN IDs for use with said first service.

13. The method of claim 1 wherein said default service is a VPL service and said first service is a non-VPL service.

14. A system for managing network traffic at a provider edge device (PE) comprising:
means for explicitly identifying a set of virtual local area network (VLAN) identifiers (IDs) for use with a first service;
means for receiving traffic from a customer at said PE, wherein said PE connects to other PEs via a tunnel-capable network;
means for classifying said received traffic; and
means for associating said traffic with said first service in response to said classification if said traffic has a VLAN ID from the explicitly identified set of VLAN IDs and for associating said traffic with a default service in response to said classification if said traffic does not have a VLAN ID from the explicitly identified set of VLAN IDs; and
means for redefining the explicitly identified set of VLAN IDs without having to redefine VLAN IDs that result in traffic being associated with the default service.

15. The system of claim 14 wherein said classification means classifies said traffic at least in part based on a VLAN ID that is associated with said packet.

16. The system of claim 14 wherein said classification means classifies said traffic at least in part based on the port of entry of said traffic.

17. The system of claim 14 wherein said classification means classifies said traffic at least in part based on the port of entry of said traffic and the VLAN ID of said traffic.

18. The system of claim 14 wherein said tunnel-capable network is a multiprotocol label switching (MPLS) network.

19. The system of claim 18 further including a virtual private LAN service (VPLS) engine for encapsulating packets with a tunnel label and a VC label for transport across said MPLS network.

20. The system of claim 14 further including a VPLS engine for forwarding said traffic from said PE utilizing a VPLS over MPLS technique that involves encapsulating packets with a tunnel label and a VC label.

21. The system of claim 14 wherein said associating means includes means for identifying an L2 forwarding equivalency class (FEC) that is related to said first service and for identifying an L2 FEC class that is related to said default service.

22. The system of claim 14 wherein said default service is a VPL service and said first service is a non-VPL service.

23. A method for managing network traffic comprising:
establishing a customer-specific virtual private local area network (VPL) through a multiprotocol label switched (MPLS) domain;
explicitly identifying a set of virtual local area network (VLAN) identifiers (IDs) for use with non-VPL traffic;
receiving traffic from a customer at a provider edge device (PE), wherein said PE connects to other PEs via said MPLS domain;
examining said traffic to identify non-VPL traffic;
extracting identified non-VPL traffic from said customer-specific VPL;
forwarding the non-extracted traffic within said customer-specific VPL; and
redefining the explicitly identified set of VLAN IDs without having to redefine a set of VLAN IDs that result in traffic being forwarded within said customer-specific VPL.

24. The method of claim 23 wherein identifying a set of VLAN IDs includes identifying a set of IEEE 802.1q VLAN IDs for use with non-VPL traffic.

25. The method of claim 23 wherein examining said traffic to identify non-VPL traffic includes determining whether said traffic is non-VPL traffic before determining whether said traffic is VPL traffic.

26. The method of claim 25 further including an initial step of comparing the VLAN ID of said traffic to the identified set of non-VPL VLAN IDs.

27. The method of claim 26 further including identifying traffic, which has a VLAN ID that does not match the identified set of non-VPL VLAN IDs, as VPL traffic.

28. The method of claim 23 further including configuring a layer 2 (L2) functional equivalency class (FEC) that maps said non-VPL traffic to a label switching path (LSP) that does not support said customer-specific VPL.

29. The method of claim 28 further including configuring an L2 FEC that maps said VPL traffic to an LSP that supports said customer-specific VPL.

30. The method of claim 23 further including assigning a VC label and a tunnel label to a VPL packet for transmission through said MPLS domain.

31. The method of claim 23 wherein VLAN IDs have per-port significance.

32. A method for managing network traffic comprising:
establishing a customer-specific virtual private local area network (VPL) through a multiprotocol label switched (MPLS) domain;

explicitly identifying a set of virtual local area network (VLAN) identifiers (IDs) for use with non-VPL traffic;

receiving traffic from a customer at a provider edge device (PE), wherein said PE connects to other PEs via said MPLS domain;

examining said received traffic to identify non-VPL traffic;

forwarding non-VPL traffic outside of said customer-specific VPL; and forwarding the remaining traffic within said customer-specific VPL; and redefining the explicitly identified set of VLAN IDs without having to redefine VLAN IDs that result in traffic being forwarded within said customer-specific VPL.

* * * * *